United States Patent [19]

Fromont

[11] Patent Number: 5,068,834
[45] Date of Patent: Nov. 26, 1991

[54] METHOD AND DEVICE FOR CORRECTING THE SIGNALS GIVEN BY THE HYDROPHONES OF AN ANTENNA

[75] Inventor: Bernard Fromont, Contes, France

[73] Assignee: Thomson-CSF, Puteaux, France

[21] Appl. No.: 527,939

[22] Filed: May 24, 1990

[30] Foreign Application Priority Data

Jun. 2, 1989 [FR] France .................................. 89 07303

[51] Int. Cl.$^5$ .............................................. H04B 1/06
[52] U.S. Cl. .................................... 367/135; 367/153; 367/901
[58] Field of Search ................ 367/1, 20, 22, 24, 135, 367/152, 153, 178, 191, 141, 900, 901; 181/0.5

[56] References Cited

U.S. PATENT DOCUMENTS 4,222,266  9/1980  Theodoulou .................... 367/130 X
4,520,467  5/1985  Berni ................................. 367/24
4,594,695  6/1986  Garconnat ........................ 367/130

Primary Examiner—Brian S. Steinberger
Attorney, Agent, or Firm—Oblon, Spivak, McClelland, Maier & Neustadt

[57] ABSTRACT

The method and the device are designed to cause the signal of each hydrophone of an antenna to be rid of the component due to the vibrations of a wall close to which the antenna is placed. To this end, a correction signal is deducted from the signal of the hydrophone. This connection signal takes account of the vibrations of the wall measured by sensors placed on the wall, in the vicinity of the antenna. The study of the circuit which enables this correction signal to be given is done by resolving the vibration of the wall into its dominant modes of deformation.

4 Claims, 2 Drawing Sheets

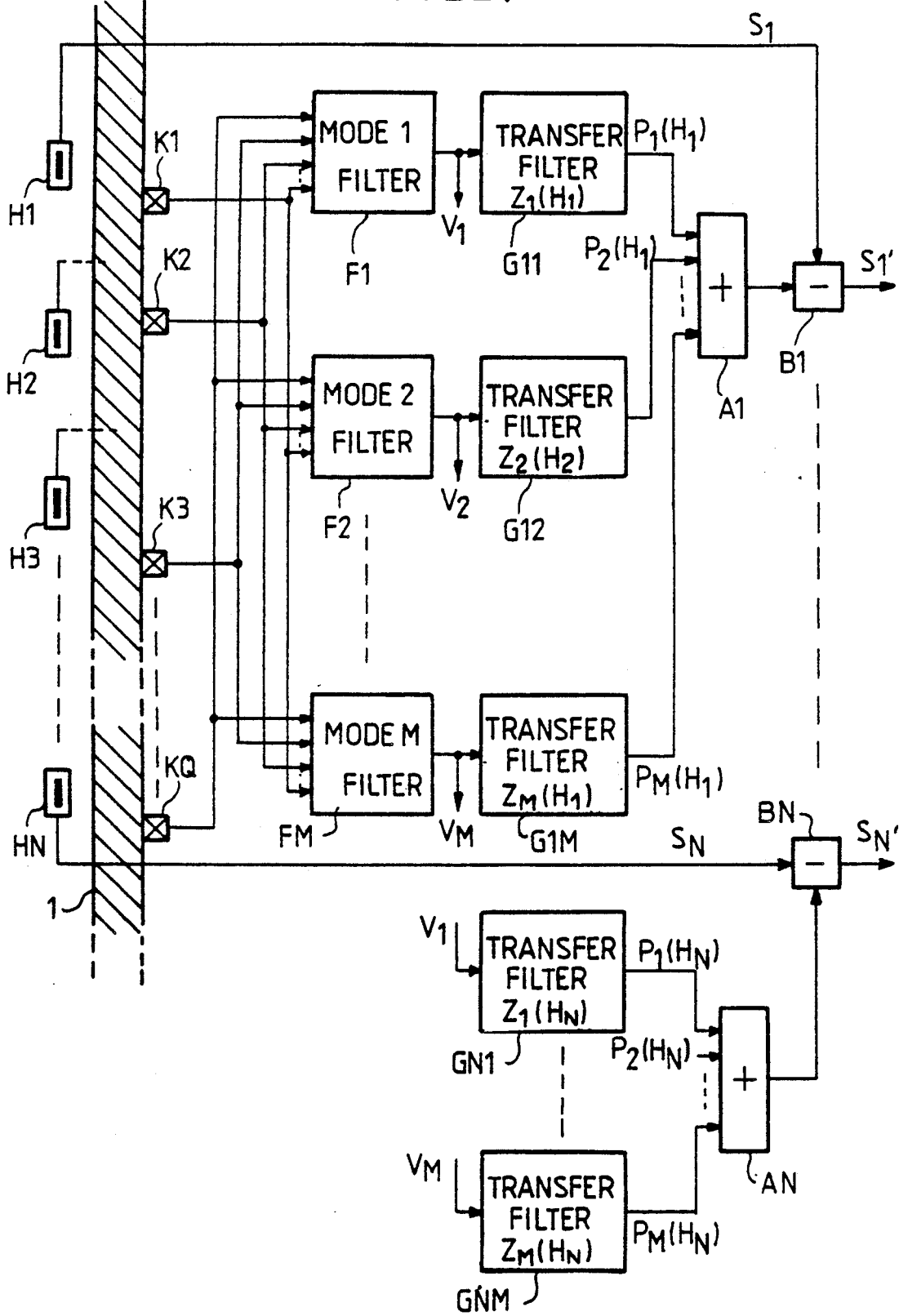

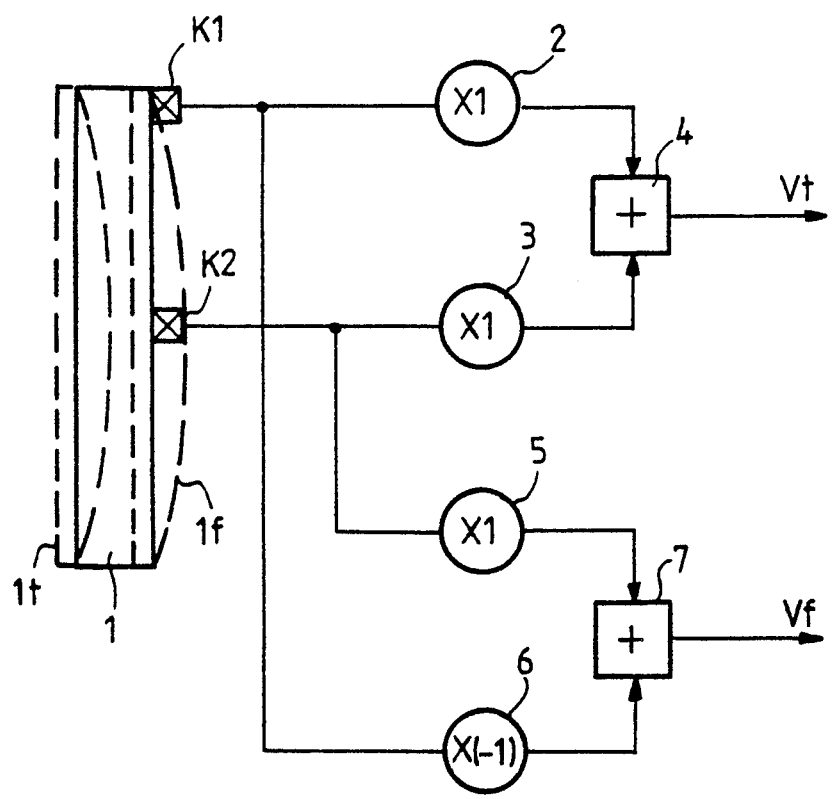
FIG_2

METHOD AND DEVICE FOR CORRECTING THE SIGNALS GIVEN BY THE HYDROPHONES OF AN ANTENNA

BACKGROUND OF THE INVENTION

1. Field of the Invention

The present invention pertains to the correction of the monitoring signals given by a sonar antenna made up of hydrophones mounted on a wall such as, for example, a hull. In the following description, the term "hull" is used by way of an example, it being understood that whatever is stated about it can be transposed to any wall subjected to vibrations in water.

Hydrophones are acoustic sensors designed to work in water and each hydrophone of the antenna gives a signal that is a function of the incident waves (the term "wave" is used in this description to mean "acoustic waves") coming from the environment external to the hull.

It may be recalled that a known way of finding the direction of an incident wave is to form channels, with each channel corresponding to a determined direction.

2. Description of the Prior Art

With hydrophones evenly spaced out at a distance d and arranged in a line that makes an angle a with a given direction, a channel in a given direction is obtained by phase-shifting the hydrophone signals by a value w.d.sin a/c where w is the pulsation of the incident wave and c is the speed of sound in water. For the channel to be properly formed, the incident wave should be planar at the frequency $w/2\pi$.

The antenna has to be mounted on a support that is generally the hull of a naval vessel (a surface or submarine vessel). Now, the hull is elastic and therefore does not form a rigid baffle: it vibrates under the effect of the incident wave, and the vibrations of the hull disturb the planeity of the wave. The result thereof is that the phase relationships among the signals received by the hydrophones are disturbed and that the formation of the channels is no longer properly ensured.

For, as is well known, each hydrophone receives the incident wave and the wave reflected on the hull. The reflected wave may be said to consist of a wave that the hull would have given if it had been perfectly still (this is the rigid baffle effect) and a wave due to the vibration induced by the incident wave.

The rigid baffle effect does not hamper the formation of the channels, for the amplitude and the phase of the corresponding waves depend little on the location of the hydrophone on the hull, irrespectively of the frequency and the incidence of the exciting wave. By contrast, the vibration has a disturbing effect.

A known way of correcting for this disturbing effect is to place an acoustic barrier between the hull and the hydrophones of the antenna. This barrier remains fixed under the effect of the incident wave reflected on it.

However, this barrier is ineffective at frequencies of below 1 kHz since it has to withstand the hydrostatic pressure and should therefore be sufficiently rigid and since its dimensions remain smaller than the wavelength of the wave that is picked up.

SUMMARY OF THE INVENTION

The present invention is aimed at correcting the output signals of hydrophones of an antenna in order to prevent or, at least, to reduce the disturbances due to vibrations of the hull.

This goal is attained by measuring the vibration of the hull and by using the measurements obtained to prepare a correction signal which, at the location of each hydrophone, is equivalent to the pressure radiated by the vibration of the hull. This correction signal is then deducted from the signal coming from each hydrophone.

According to the present invention, there is provided a method for the correction of the electrical signal coming from a hydrophone of an acoustic antenna, the hydrophone being mounted in the vicinity of a wall and being designed to pick up an acoustic signal wherein, in order to take into account at least the vibrations of the wall generated by the acoustic signal to be picked up, the method consists in the subtraction, from the electrical signal coming from the hydrophone, of the contribution related to the vibrations of the wall, through a measurement and a processing by modes of these vibrations by means of sensors positioned on the wall in the vicinity of the antenna, the output signal of each sensor being processed as many times as there are vibration modes which, it has been decided, are to be taken into account because of their disturbing influence on the signal coming from the hydrophone.

BRIEF DESCRIPTION OF THE DRAWINGS

The present invention will be understood more clearly and other characteristics will appear from the following description and from the figures pertaining thereto. Of these figures:

FIG. 1 shows a general drawing of a correction device according to the invention;

FIG. 2 shows a partial drawing of a simple exemplary embodiment of a correction device according to the invention.

In the different figures, the corresponding elements are designated by the same references.

MORE DETAILED DESCRIPTION

The vibration of a hull, like that of any structure, can be resolved into modes of vibration. A mode of vibration corresponds to a certain distribution of the vibratory speed along the hull. If x is an abscissa taken, for example, along the axis of an antenna formed by aligned hydrophones, the vibratory speed $v_m(x)$ for the mode m is the product: $v_m(x) = V_m \cdot Y_m(x)$ where $V_m$ is the original amplitude for the mode m and $Y_m(x)$ is the wave function. This wave function is known from the theory of vibrations and the measurement of $v_m(x)$. The original speed $V_m$ for the mode m, is therefore deduced from the measurement of the vibratory speed $v_m(x)$ at one point or at a few points of the hull.

Besides, it is known that an acoustic transfer impedance, for a given mode of vibration, is the ratio $Z_m(x_h) = P_m(x_h)/V_m$ where $P_m(x_h)$ is the acoustic pressure received for the mode m at a point $x_h$ where a hydrophone of the antenna is located.

The total pressure due to the vibration and received by the hydrophone is:

$$P_h = \sum_{m=1}^{\infty} Z_m(x_h) \cdot V_m$$

The impedances $Z_m(x_h)$ are determined by computation (model-building) or by calibration. It would appear therefore that the measurement in amplitude and phase of $v_m(x)$, for a certain number of modes makes it possible to obtain a signal representing $P_h$ which, in being subtracted from the signal of the hydrophone located at the point $x_h$, removes the effects of hull vibration.

This is implemented in the device according to FIG. 1.

FIG. 1 shows a sectional view of a part of the hull 1, of a ship provided with a correction device according to the invention. In the embodiment, used for carrying out experiments on the device, the ship was a surface vessel but the device according to the invention can be used also on a submarine or on the wall of any submerged elastic body provided with a system of monitoring by hydrophones.

In a standard way, hydrophones H1 to HN are fixed at a distance of some centimeters from the hull 1. These hydrophones are coated with a visco-elastic protective molding that reduces the level of the vibrations transmitted to them by the aquatic environment only to a very small extent.

The hydrophones H1 to HN respectively give signals $S_1$ to $S_N$ which are applied, respectively, to subtractors B1 to BN. These subtractors subtract a correction signal from the signal that comes to them from a hydrophone. This correction signal is designed, as far as it is possible, to rid the hydrophone signal of its components due to the vibrations of the hull.

Vibration sensors K1 to KQ, constituted, in the example described, by acceleration meters, are distributed on the internal wall of the hull, in the vicinity of the antenna formed by the hydrophones.

The signals given by the vibration sensors represent the vibratory speed v(x) sampled at the points of measurement of the sensors. All these signals are applied to mode filters, F1 to FM, relating respectively to M modes of vibration of the hull which, it has been decided, are to be taken into account because of their disturbing influence on the signals of the hydrophones. It must be noted that the number Q of vibration sensors should be greater than or equal to the number M of vibration modes taken into account.

Each of the M mode filters performs a processing operation for the mode m to which it corresponds. This processing operation gives the original amplitude and phase:

$$V_m = v_m(x)/Y_m(x)$$

taking into account that $$v(x) = \sum_{m=1}^{\infty} v_m(x).$$

To do this filtering, the signals v(x) delivered by the sensors are multiplied by known coefficients which are a function of the frequency and are determined for the mode considered, and the signals thus obtained are added together. An exemplary embodiment of a device to carry out a mode filtering operation such as this is described further below with the help of FIG. 2.

Each of the M signals $V_1$ to $V_m$ is then multiplied, by the transfer impedance $Z_m(H_i)$ relating to the mode m considered and to the hydrophone i considered. As $Z_m(H_i)$ is a function of the frequency, the circuits that carry out this operation thus perform a filtering operation and are called transfer filters in FIG. 1. Thus, to the hydrophone H1, there correspond, respectively for the modes 1 to M, the transfer filters G11 to G1M, the impedances of which are respectively marked $Z_1(H_1)$ to $Z_M(H_1)$. And, to the hydrophone HN, there correspond the transfer filters GN1 to GNM that relate respectively to the modes 1 to M and receive respectively the same input signals $V_1$ to $V_M$. The transfer functions of these filters are marked $Z_1(H_N)$ to $Z_M(H_N)$.

The output signals of the transfer filters represent the pressures $P_m(H_i)$ relating, for a given hydrophone i, to a mode m considered. For a given hydrophone i, an adder Ai computes the sum of the pressure signals relating to this hydrophone in the modes 1 to M considered. Thus the adder A1 computes the sum of the pressure signals $P_1(H_1)$ to $P_M(H_1)$. The adder Ai gives a pressure signal representing the total pressure generated by the hull vibrations on the hydrophone $H_i$. This signal constitutes the correction signal which is subtracted from the signal of the hydrophone Hi. Thus, FIG. 1 shows that the total pressure signal given by the adder A1 is subtracted from the signal $S_1$ of the hydrophone H1 in the subtractor B1. This enables the subtractor B1 to give the corrected signal $S_1'$.

FIG. 2 shows a plate 1, seen by the edge, subjected to two main modes of vibration, one of which is a transition mode causing shifts of the plate that make it go through a position 1t indicated by a line of dashes. The other mode is a mode of flexion of the first order that makes it go through a position 1f indicated by a line of dashes used for 1t.

Two vibration sensors K1, K2 are respectively positioned at one of the ends and in the middle of the plate 1.

The translation mode filter, to give a signal Vt representing the speed of translation of the plate 1, is obtained by the multiplication by "1", in two multiplication circuits 2, 3, of the signals given by the sensors K1 and K2. These multiplication circuits are followed by an adder 4, the output signal of which is the signal Vt.

The filter of the first order flexion mode, to give a signal Vf representing the speed of flexion of the plate 1, is obtained by multiplying the signal given by the sensor K2 by "1" in a multiplication circuit 5, multiplying the signal given by the sensor K1 by "−1" in a multiplication circuit 6 and adding up the signals delivered by the multiplication circuits 5 and 6 in an adder 7. These multiplication coefficients, respectively equal to "1" and "−1", are derived from the fact that, for the mode of flexion considered, and at the places where the sensors K1 and K2 are positioned, the signals representing the speed of flexion are in phase opposition.

According to a preferred embodiment, the method for correcting the signals given by the hydrophones is implemented digitally. To this end, the signals of the vibration sensors are digitized. The mode and transfer filtering operations are performed in a computer. The multiplier coefficients for the signals v(x) and the values of the transfer impedances are memorized. These values are determined by calibration during preliminary experiments. The "theoretical" response of the hydrophones to a given signal, in the absence of vibrations, is known and is memorized. The values of the mode filtering coefficients and of the impedances of the transfer filters are obtained by reducing the difference between the theoretical response of each hydrophone and its real response to the minimum. The reducing of this difference to the minimum is obtained by a software program based on the known Newton method using successive iterations.

It must be noted that the invention enables the correction of disturbances from hull vibrations produced by sources external to the hull as well as those produced by internal sources.

What is claimed is:

1. A device for the correction of signals output by hydrophones of an antenna mounted on a wall, comprising a plurality of vibration sensors mounted on the wall at the antenna and, for each hydrophone, a processing means followed by an adder to give a correction signal as a function of output signals delivered by the sensors and a subtractor to subtract a correction signal from the signal output by each hydrophone, wherein each processing circuit comprises, in series, a mode filter which carries out a weighted addition of signals output by the sensors and a transfer filter.

2. A device according to claim 1, wherein the mode filters are common to correction circuits for the hydrophones of the antenna.

3. A device for correcting an electrical signal output from a hydrophone of an acoustic antenna which detects an acoustic signal, the hydrophone being mounted at a wall, comprising:

a plurality of sensors mounted on an inside of said wall at said acoustic antenna, for measuring a predetermined number of modes of vibrations generated by said acoustic signal to thereby output a measurement signal;

processing means for processing said measurement signal as many times as the predetermined number of vibration modes which have a disturbing influence on said electrical signal to thereby output a correction signal, wherein each of said processing means comprises:

a mode filter for implementing a weighted addition of said measurement signals; and a transfer filter in series with said mode filter; and a subtracting means for subtracting said correction signal from said electrical signal output from said hydrophone.

4. A device according to claim 3, wherein each of said mode filters are common to each of said sensors.

* * * * *